(12) United States Patent
Iwashita et al.

(10) Patent No.: US 6,279,913 B1
(45) Date of Patent: Aug. 28, 2001

(54) SLIDING MEMBER AND MANUFACTURING METHOD THEREOF

(75) Inventors: Takatsugu Iwashita, Matsumoto; Nobuyuki Yamashita, Shiojiri, both of (JP)

(73) Assignee: Teikoku Piston Ring Co., Ltd., Tokyo (JP)

(*) Notice: Subject to any disclaimer, the term of this patent is extended or adjusted under 35 U.S.C. 154(b) by 0 days.

(21) Appl. No.: 09/352,329

(22) Filed: Jul. 13, 1999

(30) Foreign Application Priority Data

Oct. 15, 1998 (JP) .................................................. 10-309439

(51) Int. Cl.$^7$ ........................................................ F16J 9/26
(52) U.S. Cl. ........................ 277/442; 277/440; 277/434; 428/323; 428/325; 428/408; 428/446; 428/457
(58) Field of Search ...................................... 428/408, 323, 428/325, 457, 446; 277/440, 442, 434

(56) References Cited

U.S. PATENT DOCUMENTS

| 4,974,498 | 12/1990 | Lemelson ................................. 92/223 |
| 5,237,967 | * 8/1993 | Willermet et al. ...................... 428/408 |
| 5,478,650 | 12/1995 | Davanloo et al. ...................... 428/408 |
| 5,771,873 | * 6/1998 | Potter et al. ........................... 123/657 |
| 5,989,511 | * 11/1999 | Gruen et al. ........................... 423/446 |

FOREIGN PATENT DOCUMENTS

| 3-2603362 | 11/1991 | (JP) . |
| 5179451 | 7/1993 | (JP) . |

* cited by examiner

*Primary Examiner*—Archene Turner
(74) *Attorney, Agent, or Firm*—Armstrong, Westerman, Hattori, McLeland & Naughton, LLP

(57) ABSTRACT

A piston ring is formed over the entire surface with a gas nitrided layer. A diamond-like carbon film is formed in a thickness of 0.5 to 30 micrometers over the gas nitrided layer at the upper and lower surfaces. The diamond-like carbon film has a surface structure in which diamond-like carbon has been deposited in nodular shapes in sizes of 0.5 to 5 micrometers. The diamond-like carbon is configured with any one of an amorphous carbon structure, an amorphous carbon structure having partly a diamond structure, or an amorphous carbon structure having partly a graphite structure.

5 Claims, 4 Drawing Sheets

SLIDING MEMBER AND MANUFACTURING METHOD THEREOF

BACKGROUND OF INVENTION

1. Field of the Invention

The present invention relates to a sliding member such as a piston ring utilized in reciprocating internal combustion engines and, more particularly, to a piston ring assembled into the ring groove of an aluminum alloy piston.

2. Description of the Related Art

In recent years, engines have been required to meet increased demands for higher outputs, high revolutions per minute and longer product service life and must also comply with ever stricter exhaust gas emission regulations. The piston ring must therefore function in a yet harsher operating environment. Many of such piston rings are formed typically with a chromium plating film, nitrided layer or physical vapor deposition film on the upper and lower surfaces.

However, when the upper and lower surfaces of a piston ring having a nitrided layer or a physical vapor deposition film are subjected to repeated impacts at high temperatures with the ring groove surfaces of the aluminum alloy piston, aluminum adhesion then occurs on the upper and lower surfaces of the piston ring, causing a large increase in ring groove wear.

A method is known however, for suppressing aluminum adhesion in the initial stages of engine operation by coating the upper and lower surfaces of the piston ring with a synthetic resin film containing solid lubricant. However, this synthetic resin film has poor wear resistance, so this method has the drawback that suppression of the aluminum adhesion does not last long.

Methods were also proposed for applying a thin film of artificial diamond material to the top surface and outer circumferential surface and ring groove of the piston and to the piston ring in order to improve durability as described in Japanese Patent Laid-open No. 3-260362. However, no detailed description of this thin film of artificial diamond material is listed in Japanese Patent Laid-open No. 3-260362.

Another method (Japanese Patent Laid-open No. 5-179451) as described next, involved use of a diamond-like carbon film. In this method, in order to restrict the adhesion of ferrite structures, a film having amorphous carbon as the main constituent in which tungsten and/or silicon was dispersed was formed on the sliding surface which mates with a sliding surface formed of iron-type material containing ferrite. This technology is utilized for instance, in the hydraulic valve in power steering mechanisms. However, this Japanese Patent Laid-open No. 5-179451 listed absolutely no information regarding aluminum adhesion on the upper and lower surfaces of the piston rings mating with aluminum alloy pistons.

SUMMARY OF INVENTION

It is an object of the present invention to provide a sliding member with improved resistance to aluminum adhesion suitable for use at high temperatures and high loads with aluminum alloy as the mating material.

The present invention is a sliding member having a diamond-like carbon film on a sliding surface of the sliding member, wherein the diamond-like carbon film has a surface structure in which diamond-like carbon has been deposited in nodular shapes in sizes of 0.5 to 5 micrometers.

The diamond-like carbon forming a film of the present invention is configured from any one of the following structures.

1. Amorphous carbon structure
2. Amorphous carbon structure having partly a diamond structure.
3. Amorphous carbon structure having partly a graphite structure.

In the process of investigating the property of films comprising diamond-like carbon deposited under various conditions, the inventors discovered that diamond-like carbon films having a surface structure in which diamond-like carbon has been deposited in nodular shapes has two advantages compared to films having a surface structure in which diamond-like carbon has been deposited in a layer shape. The first advantage is that the film has extremely high adhesive strength. The second advantage is that aluminum adhesion is not prone to occur to the film. Aluminum adhesion is easily prone to occur in defect portions where pits or film collapse are present, so the fact that the diamond-like carbon film of the present invention is resistant to aluminum adhesion is probably due to the high adhesive strength of the film.

The precise mechanism by which the deposition structure of the diamond-like carbon film influences adhesive strength is not clear. However, it is thought that in film having a surface structure in which diamond-like carbon has been deposited in nodular shapes, the boundary between respective nodules has a buffer effect so that strain occurring in a localized section is not prone to be conveyed to a remote section. Also thought is that in film having a surface structure in which diamond-like carbon has been deposited in nodular shapes, deposition tends to occur with the internal strain at a low level.

The nodules observed on the surface have preferably a size within a range of 0.5 to 5 micrometers. When the size of the nodules is less than 0.5 micrometers, the diamond-like carbon film has a surface structure with a smooth layer shape. When the size of the nodules is greater than 5 micrometers, pits or film collapse tends to easily occur.

In order to obtain the film having a surface structure in which diamond-like carbon has been deposited in nodular shapes, non-uniform fine irregularities (concavities and protrusions) are first formed on the surface to be covered with the film, and this surface then covered with the diamond-like carbon film. The non-uniform fine irregularities can be formed by means of lapping or blasting. The surface roughness of the irregular surface to be covered is preferably within a range of 0.05 to 1 micrometer Ra.

When the irregularities on the surface to be covered are too fine, the diamond-like carbon film has a surface structure with a smooth layer shape and peeling or cracks are prone to occur. Further, when the irregularities on the surface to be covered are too large, the surface roughness of the diamond-like carbon film becomes large so that the sliding characteristics degrade and peeling or film collapse is prone to occur. A surface formed by a grindstone is not preferred, even if the same surface roughness is achieved, because regular grinding marks are formed. The film comprising diamond-like carbon deposited on such a ground surface has a surface structure with a smooth layer shape and peeling is prone to occur in the groove-shaped mark portions left by the grinding.

The surface roughness of the diamond-like carbon film of the present invention is preferably within a range of 0.07 to 1.5 micrometers Ra and when the film is utilized in a piston ring, a film thickness is preferably within a range of 0.5 to 30 micrometers. When the film thickness is below 0.5 micrometers, the service life of the piston ring decreases, and when above 30 micrometers, the adhesive strength deteriorates and consequently the resistance to aluminum adhesion declines.

The diamond-like carbon film may be directly formed on the sliding surface or may be formed on a hard chromium plating film, a gas nitrided layer, or an ion plating film.

The scuffing resistance of the diamond-like carbon film is inherently high, however a film having improved scuffing resistance, improved wear resistance and improved resistance to aluminum adhesion can be obtained by including one or more elements in an atomic content of 5 to 40 percent selected from the group consisting of silicon, titanium, tungsten, chromium, molybdenum, niobium, and vanadium. The one or more elements are present as metal or carbides or both.

DESCRIPTION OF PREFERRED EMBODIMENTS

Hereafter, the embodiments of the present invention will be described while referring to FIGS. 1A, 1B and 1C.

Figure 1A:
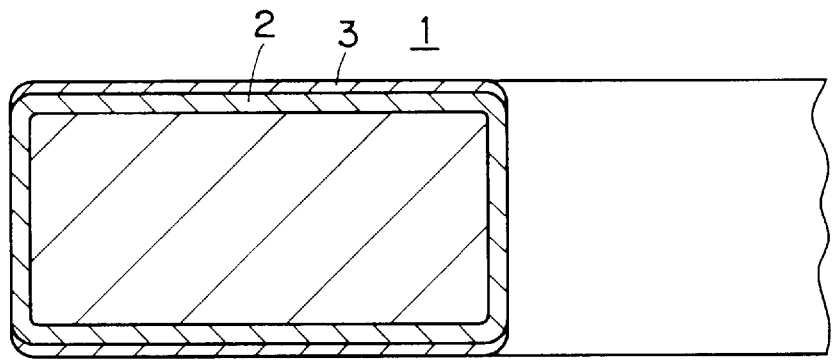
FIGS. 1A, 1B and 1C are respectively longitudinal cross-sectional views of a portion of the piston rings of the embodiments of the present invention.

In FIG. 1A, a piston ring 1 is formed over the entire surface with a gas nitrided layer 2 in a thickness of 5 to 150 micrometers. A diamond-like carbon film 3 containing one or more elements in an atomic content of 5 to 40 percent selected from the group consisting of silicon, titanium, tungsten, chromium, molybdenum, niobium and vanadium is formed in a thickness of 0.5 to 30 micrometers over the gas nitrided layer 2 at the upper and lower surfaces. The diamond-like carbon film 3 has a surface structure in which diamond-like carbon has been deposited in nodular shapes in sizes of 0.5 to 5 micrometers. The diamond-like carbon film 3 further has a Vicker's hardness in a range of HV700 to HV2000.

Figure 1B:
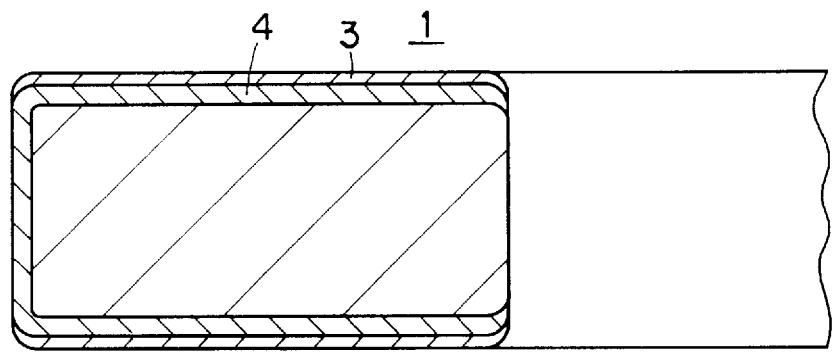

Another example is shown in Fig. 1B. A hard chromium plating film, or ion plating film 4 such as chromium nitride (CrN, $Cr_2N$) film or titanium nitride (TiN) film is formed on the upper and lower surfaces and the outer circumferential surface of the piston ring 1. The diamond-like carbon film 3 is formed in a thickness of 0.5 to 30 micrometers over the film 4 at the upper and lower surfaces. When hard chromium plating film is used, the film thickness is 5 to 150 micrometers, and when ion plating film is used, the film thickness is 1 to 150 micrometers.

Figure 1C:
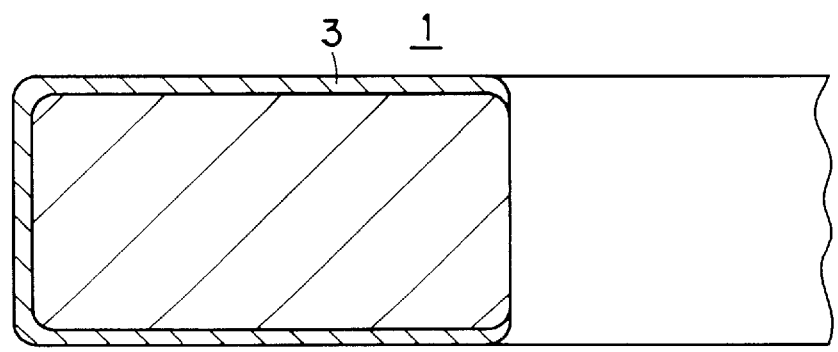

FIG. 1C shows an example of the diamond-like carbon film 3 directly formed in a thickness of 0.5 to 30 micrometers on the upper and lower surfaces of the piston ring 1 without forming a wear resistant surface treatment layer (gas nitrided layer 2, or hard chromium plating film or ion plating film 4) which is different in type from the diamond-like carbon film 3. The diamond-like carbon film 3 was formed on the outer circumferential surface of the piston ring 1.

The diamond-like carbon film 3 of the above described embodiment was formed on the upper and lower surfaces of the piston ring 1, however the diamond-like carbon film 3 may be formed on just one surface of either the upper or lower surface.

The diamond-like carbon film 3 can be coated by using physical vapor deposition process such as reactive ion plating process or reactive sputtering process. For instance, the diamond-like carbon film 3 is coated onto the piston ring by the reactive ion plating process as related below. That is, an inert gas is introduced into a vacuum chamber while the piston ring is rotated. After cleaning the piston ring surface by ion bombardment, a hydrocarbon gas such as methane which is a source of carbon is introduced into the chamber and while the vicinity of the piston ring is maintained in a plasma state, one or more elements selected from the group consisting of silicon, titanium, tungsten, chromium, molybdenum, niobium, and vanadium are vaporized. In such cases, by adjusting the partial pressure of hydrocarbon gas in the reactive gas, the one or more atoms selected from the group consisting of silicon, titanium, tungsten, chromium, molybdenum, niobium, and vanadium can be deposited as a carbide. The ratio of the respective contents of the one or more elements selected from the group consisting of silicon, titanium, tungsten, chromium, molybdenum, niobium, and vanadium can be controlled by adjusting the pressure of the reactive gas as well as the evaporation speed of these elements.

Hereafter, the test results of the piston ring of the present invention will be explained.

As shown in Table 1, grinding with various methods was performed on the upper and lower surfaces of 12Cr stainless steel compression rings that were subjected to gas nitriding (surface hardness: HV1100, nitriding depth: 70 micrometers).

TABLE 1

| | No. | GRINDING METHOD FOR UPPER/ LOWER SURFACE | SURFACE STRUCTURE OF DIAMOND-LIKE CARBON FILM |
|---|---|---|---|
| EMBODI-MENT | 1 | Lapping: (Surface roughness: 0.07 micrometers Ra) | Structure with nodular shapes (Nodule size: 1.5 to 2 micrometers) |
| | 2 | Blasting: (Surface roughness: 0.9 micrometers Ra) | Structure with nodular shapes (Nodule size: 2 to 5 micrometers) |
| COMPAR-ATIVE EXAMPLE | 1 | Grinding with grindstone: (Surface roughness: 0.08 micrometers Ra) | Structure with a smooth layer shape |
| | 2 | Lapping: (Surface roughness: 0.01 micrometers Ra) | Structure with a smooth layer shape |
| | 3 | Lapping: (Surface roughness: 2.0 micrometers Ra) | Structure with nodular shapes (Nodule size: 3 to 7 micrometers) |

Next, the diamond-like carbon film containing 15 percent silicon was formed in a thickness of 2 micrometers, on the upper and lower surfaces of the compression ring by the previously related reactive ion plating method.

Figure 2A:
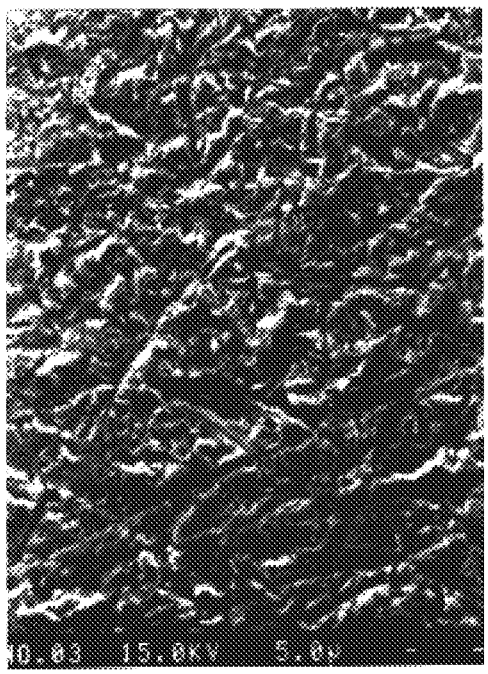
FIG. 2A is a photograph taken with a scanning electron microscope (magnification of 1200 times) of the surface of the piston ring of the embodiment 1 after grinding was performed.
Figure 2B:
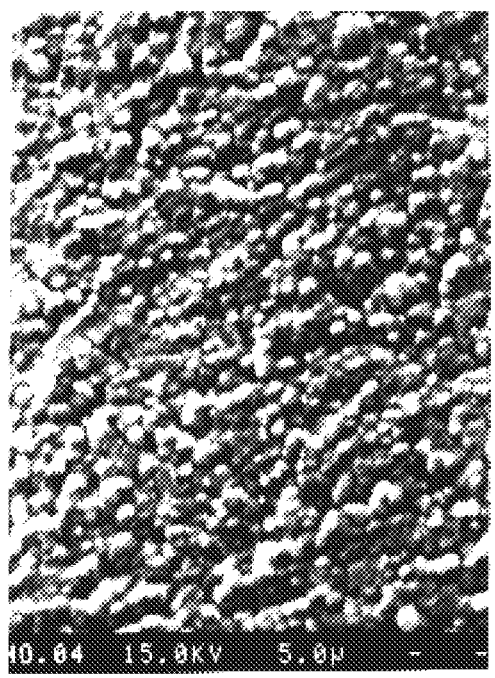
FIG. 2B is a photograph taken with a scanning electron microscope (magnification of 1200 times) of the surface of the piston ring of the embodiment 1 after forming the diamond-like carbon film.
Figure 3A:
FIG. 3A is a photograph taken with a scanning electron microscope (magnification of 1200 times) of the surface of the piston ring of the comparative example 1 after grinding was performed.
Figure 3B:
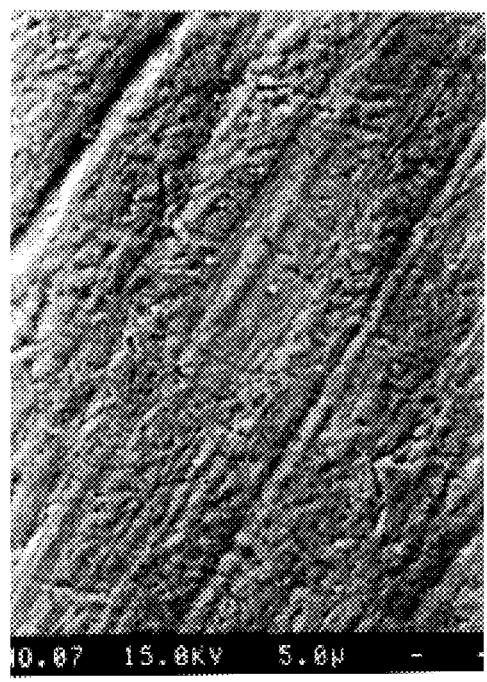
FIG. 3B is a photograph taken with a scanning electron microscope (magnification of 1200 times) of the surface of the piston ring of the comparative example 1 after forming the diamond-like carbon film.

Photographs taken with a scanning electron microscope of the piston ring surfaces after grinding and forming of the diamond-like carbon film are shown in FIGS. 2A and 2B (embodiment 1) and FIGS. 3A and 3B (comparative example 1).

The indentation test is described next.

In the Rockwell hardness tester, a penetrator was pressed into the diamond-like carbon film from above and the periphery of the indentation marks observed with a stereoscopic microscope (magnification of 100 times) for the presence of cracks or peeling. The tip of the diamond penetrator had a curvature diameter of 0.2 mm and a conical angle of 120 degrees. A pressing load was 588.4N. The results of this test shown in Table 2.

TABLE 2

|  | NO. | INDENTATION TEST |
| --- | --- | --- |
| EMBODIMENT | 1 | ○ |
|  | 2 | ○ |
| COMPARATIVE | 1 | X |
| EXAMPLE | 2 | X |
|  | 3 | X |

Note: The ○ symbol indicates no presence of cracks and peeling. The X symbol indicates the presence of cracks and peeling.

The engine test is described next.

Figure 4:
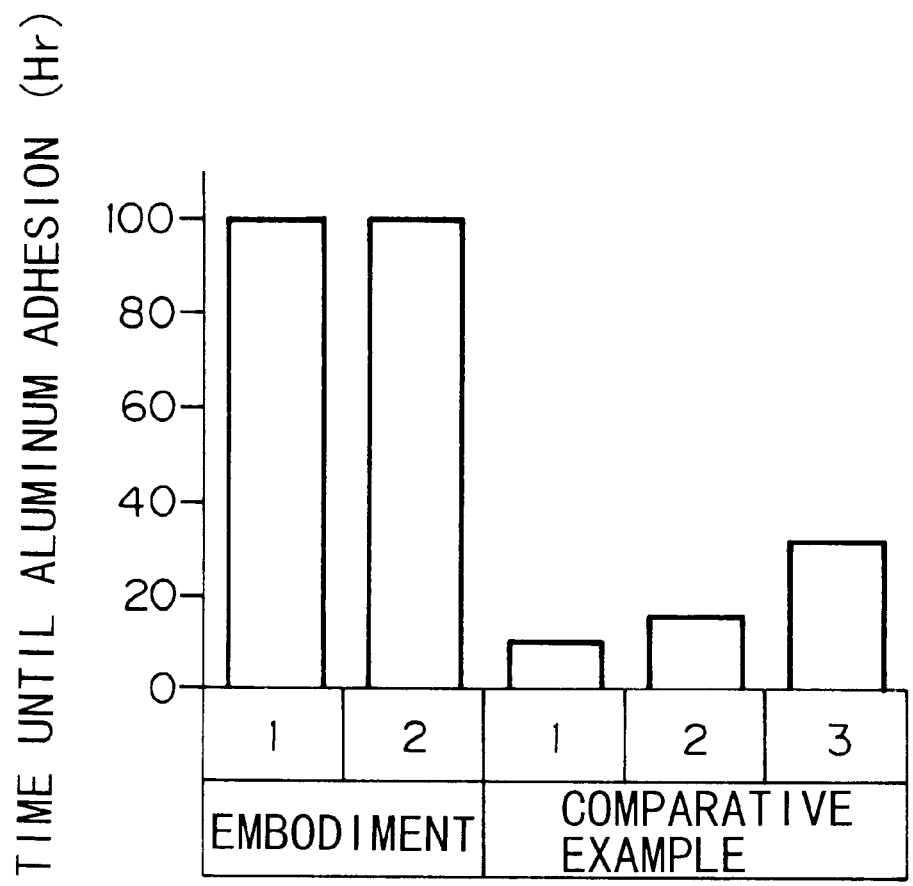
FIG. 4 is a graph showing test results from the engine test.

The aforementioned compression rings were mounted in a 2000 cc displacement, in-line four cylinder gasoline engine with a cylinder bore of 86 mm and the engine operated under full load conditions at 5000 rpm. The engine was disassembled every ten hours and the compression rings examined to determine the time required for aluminum adhesion to occur. The results are shown in FIG. 4. As can be seen, the compression rings of the embodiments 1 and 2 have superior resistance to aluminum adhesion compared to the compression rings of the comparative examples 1 through 3. It is thought that the compression rings of the comparative examples 1 through 3 are easily prone to aluminum adhesion mainly because of the poor adhesive strength of the film since aluminum adhesion occurs in portions where cracks or film collapse is present.

Although the present invention has been described with reference to the preferred embodiments, it is apparent that the present invention is not limited to the aforesaid preferred embodiments, but various modification can be attained without departing from its scope.

What is claimed is:

1. A sliding member having a diamond-like carbon film on a sliding surface of said sliding member, wherein said diamond-like carbon film has a surface structure in which diamond-like carbon has been deposited in nodular shapes in sizes of 0.5 to 5 micrometers, and a mating material for said sliding member is made of aluminum alloy.

2. A sliding member as claimed in claim 1, wherein said diamond-like carbon film is formed on a hard chromium plating film, a gas nitrided layer or an ion plating film.

3. A sliding member as claimed in claim 1, wherein said diamond-like carbon film is formed directly on the sliding surface.

4. A sliding member as claimed in claim 1, wherein said diamond-like carbon film contains one or more elements selected from the group consisting of silicon, titanium, tungsten, chromium, molybdenum, niobium and vanadium.

5. A sliding member as claimed in claim 1, wherein said sliding member is a piston ring and said sliding surface is at least one surface of the upper and lower surfaces of said piston ring.

\* \* \* \* \*